(12) United States Patent  
Kamble et al.

(10) Patent No.: US 9,112,801 B2
(45) Date of Patent: Aug. 18, 2015

(54) QUANTIZED CONGESTION NOTIFICATION IN A VIRTUAL NETWORKING SYSTEM

(71) Applicant: INTERNATIONAL BUSINESS MACHINES CORPORATION, Armonk, NY (US)

(72) Inventors: Keshav G. Kamble, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/840,492

(22) Filed: Mar. 15, 2013

(65) Prior Publication Data

US 2014/0269321 A1    Sep. 18, 2014

(51) Int. Cl.
*G01R 31/08* (2006.01)
*H04L 12/833* (2013.01)

(52) U.S. Cl.
CPC ..................................... *H04L 47/31* (2013.01)

(58) Field of Classification Search
None
See application file for complete search history.

(56) References Cited

U.S. PATENT DOCUMENTS

| | | | |
|---|---|---|---|
| 6,426,944 B1 | 7/2002 | Moore | |
| 7,188,364 B2 | 3/2007 | Volpano | |
| 7,424,019 B1 | 9/2008 | Kopelman et al. | |
| 7,478,173 B1 | 1/2009 | Delco | |
| 7,702,742 B2 | 4/2010 | Tanaka et al. | |
| 7,885,276 B1 | 2/2011 | Lin | |
| 8,665,706 B2 | 3/2014 | Tan | |
| 8,718,061 B2 | 5/2014 | Chiueh et al. | |
| 8,892,706 B1 | 11/2014 | Dalal | |
| 2009/0141729 A1 | 6/2009 | Fan | |
| 2009/0268614 A1 | 10/2009 | Tay et al. | |
| 2011/0051723 A1 | 3/2011 | Rabie et al. | |
| 2011/0141891 A1 | 6/2011 | So | |
| 2011/0283017 A1 | 11/2011 | Alkhatib et al. | |

(Continued)

FOREIGN PATENT DOCUMENTS

| | | |
|---|---|---|
| CN | 102835080 A | 12/2012 |
| CN | 102857416 A | 1/2013 |

(Continued)

OTHER PUBLICATIONS

Edwards, A. et al., "Diverter: A New Approach to Networking Within Virtualized Infrastructures", Proceedings of the First ACM Workshop on Research on Enterprise Networking (WREN '09), Aug. 2009, pp. 103-110, ACM, USA.

(Continued)

*Primary Examiner* — Kibrom T Hailu
(74) *Attorney, Agent, or Firm* — Sherman IP LLP; Kenneth L. Sherman; Hemavathy Perumal

(57) ABSTRACT

Embodiments of the invention provide a method for quantized congestion notification in a virtual networking system comprising multiple virtual networks (VNs). Each VN comprises at least one virtual machine (VM) configured to generate one or more packet flows. Each packet of each packet flow is tagged with a congestion notification (CN) tag. Each packet flow is mapped to a corresponding virtual tunnel end point (TEP) that distributes each packet of the packet flow. A congestion notification message (CNM) is generated for each congestion point (CP) associated with each packet flow. Each CP is mapped to a corresponding TEP that distributes each CNM for the CP, wherein the corresponding VTEP forwards the CNM to a VM contributing to packet congestion at the CP.

20 Claims, 14 Drawing Sheets

(56) References Cited

U.S. PATENT DOCUMENTS

| | | | |
|---|---|---|---|
| 2011/0299532 A1* | 12/2011 | Yu et al. ..................... | 370/392 |
| 2011/0299537 A1 | 12/2011 | Saraiya et al. | |
| 2012/0063316 A1 | 3/2012 | Ghanwani et al. | |
| 2012/0093034 A1 | 4/2012 | Kamath et al. | |
| 2012/0173757 A1 | 7/2012 | Sanden | |
| 2012/0250682 A1 | 10/2012 | Vincent et al. | |
| 2012/0275328 A1 | 11/2012 | Iwata et al. | |
| 2012/0290703 A1 | 11/2012 | Barabash et al. | |
| 2012/0307638 A1* | 12/2012 | Bergamasco et al. ......... | 370/236 |
| 2014/0086253 A1 | 3/2014 | Yong | |
| 2014/0254603 A1 | 9/2014 | Banavalikar et al. | |
| 2014/0269709 A1 | 9/2014 | Benny et al. | |
| 2014/0269712 A1 | 9/2014 | Kidambi | |

FOREIGN PATENT DOCUMENTS

| | | |
|---|---|---|
| CN | 102946354 A | 2/2013 |
| KR | 100865722 B1 | 10/2008 |

OTHER PUBLICATIONS

Birman, K.P., "Technology Challenges for Virtual Overlay Networks", IEEE Transactions on Systems, Man and Cybernetics, Part A: Systems and Humans, Jul. 2001, pp. 319-327, vol. 31, No. 4, IEEE, USA.
Recio, R., "Distributed Overlay Virtual Ethernet (DOVE) Networks", PowerPoint Presentation, 2012, Slides 1-27, IBM Corporation, USA.
International Search Report and Written Opinion dated Jun. 17, 2014 for International Application No. PCT/CN2014/073118 from State Intellectual Property Office of the P.R.China (ISA/CN), pp. 1-11, Beijing, China.
Iwata, A. et al., "Global Open Ethernet Architecture for a Cost-Effective Scalable VPN Solution", IEICE Transactions Communication, Jan. 2004, pp. 142-151, vol. E87-B, No. 1, Institute of Electronics, Information, and Communication, Japan.
Anonymous, "Intelligent MCs Debunk Perceptions", Communications News, Oct. 2004, pp. 2, 42, & 44, vol. 41, No. 10, Nelson Publishing, Inc., USA.
Cisco Corporation, "Routing Between VLANs Overview", Cisco IOS Switching Services Configuration Guide, 2010, pp. XC-302-XC-312, Cisco Corporation, USA.
Andersen, D.G., "Improving End-to-End Availability Using Overlay Networks", Doctoral Thesis in Computer Science and Engineering, Feb. 2005, pp. 1-150, Massachusetts Institute of Technology, USA.
Mao, Y. et al., "MOSAIC: Unified Platform for Dynamic Overlay Selection and Composition", University of Pennsylvania CIS Technical Report, pp. 1-14, University of Pennsylvania, USA.
Mao, Y. et al., "MOSAIC: Multiple Overlay Selection and Intelligent Composition", University of Pennsylvania CIS Technical Report, 2007, pp. 1-14, University of Pennsylvania, USA.
Patel, B.V. et al., "An Architecture and Implementation Toward Multiprotocol Mobility", IEEE Personal Communications, Jun. 1995, pp. 32-42, vol. 2, No. 3, IEEE, USA.
U.S. Non-Final Office Action for U.S. Appl. No. 13/831,215 mailed Aug. 25, 2014.
U.S. Non-Final Office Action for U.S. Appl. No. 13/791,719 mailed Sep. 24, 2014.
International Search Report and Written Opinion dated Jun. 30, 2014 for International Application No. PCT/CN2014/073012 from State Intellectual Property Office of the P.R. China, pp. 1-10, Beijing, China.
Mell, P. et al., "The NIST Definition of Cloud Computing", Special Publication, Version 15, Oct. 7, 2009, 2 pages, National Institute of Standards and Technology, Information Technology Laboratory, USA.
Anonymous, "IEEE Standards for Local and metropolitan area networks—Virtual Bridged Local Area Networks" IEEE Std 802.1Q, 2003 Edition, pp. 1-152, United States.
U.S. Non-Final Office Action for U.S. Appl. No. 13/795,666 mailed Jan. 22, 2015.
U.S. Final Office Action for U.S. Appl. No. 13/831,215 mailed Dec. 9, 2014.
U.S. Notice of Allowance for U.S. Appl. No. 13/791,719 mailed Feb. 17, 2015.
U.S. Corrected Notice of Allowability for U.S. Appl. No. 13/791,719.

* cited by examiner

QUANTIZED CONGESTION NOTIFICATION IN A VIRTUAL NETWORKING SYSTEM

BACKGROUND

Embodiments of the invention relate to overlay virtual environments, and in particular, quantized congestion notification (QCN) in a virtual networking system.

Network virtualization using overlays use encapsulation, such as virtual extensible local area network (VxLAN) encapsulation and network virtualization generic routing encapsulation (NVGRE), which may be supported by hypervisor and networking vendors. To use VxLAN or NVGRE encapsulation, hypervisor virtual switches are modified to support the respective overlay technology. Incompatibility with encapsulation types makes it necessary to use a translation gateway, which translates between the different packet formats. Often the translation gateways are communication bottlenecks and impact communication performance.

BRIEF SUMMARY

One embodiment provides a method for quantized congestion notification in a virtual networking system comprising multiple virtual networks. Each virtual network comprises at least one virtual machine configured to generate one or more packet flows. Each packet of each packet flow is tagged with a congestion notification tag including a corresponding virtual flow identifier of the packet flow. Each packet flow is mapped to a corresponding tunnel end point, wherein each packet of the packet flow is distributed via the corresponding tunnel end point. A congestion notification message is generated for each congestion point associated with each packet flow, wherein the congestion notification message comprises a virtual congestion point identifier of the congestion point and a source address of a virtual machine contributing to packet congestion at the congestion point. Each congestion point is mapped to a corresponding tunnel end point, wherein each congestion notification message for the congestion point is distributed via the corresponding tunnel end point, and wherein the corresponding virtual tunnel end point forwards the congestion notification message to a virtual machine contributing to packet congestion at the congestion point.

Another embodiment provides a virtual networking system comprising multiple virtual networks. Each virtual network comprises at least one virtual machine configured to generate one or more packet flows. Each virtual network comprises a physical network interface card (NIC) including a traffic management module configured for tagging each packet of each packet flow generated by each virtual machine of the virtual network with a congestion notification tag including a corresponding virtual flow identifier of the packet flow. The traffic management module is further configured for mapping each packet flow to a corresponding tunnel end point of the virtual network, wherein each packet of the packet flow is distributed via the corresponding tunnel end point. The traffic management module is further configured for generating a congestion notification message for each congestion point associated with each packet flow, wherein the congestion notification message comprises a virtual congestion point identifier of the congestion point and a source address of a virtual machine contributing to packet congestion at the congestion point. The traffic management module is further configured for mapping each congestion point to a corresponding tunnel end point, wherein each congestion notification message for the congestion point is distributed via the corresponding tunnel end point, and wherein the corresponding virtual tunnel end point forwards the congestion notification message to a virtual machine contributing to packet congestion at the congestion point.

Another embodiment provides a computer program product for quantized congestion notification in a virtual networking system comprising multiple virtual networks, wherein each virtual network comprises at least one virtual machine configured to generate one or more packet flows. The computer program product comprises a computer-readable storage medium having program code embodied therewith, the program code being executable by a computer to tag each packet of each packet flow with a congestion notification tag including a corresponding virtual flow identifier of the packet flow. Each packet flow is mapped to a corresponding tunnel end point, wherein each packet of the packet flow is distributed via the corresponding tunnel end point. The program code is further executable by the computer to generate a congestion notification message for each congestion point associated with each packet flow, wherein the congestion notification message comprises a virtual congestion point identifier of the congestion point and a source address of a virtual machine contributing to packet congestion at the congestion point. Each congestion point is mapped to a corresponding tunnel end point, wherein each congestion notification message for the congestion point is distributed via the corresponding tunnel end point, and wherein the corresponding virtual tunnel end point forwards the congestion notification message to a virtual machine contributing to packet congestion at the congestion point.

These and other features, aspects and advantages of the present invention will become understood with reference to the following description, appended claims and accompanying figures.

DETAILED DESCRIPTION

Figure 1:
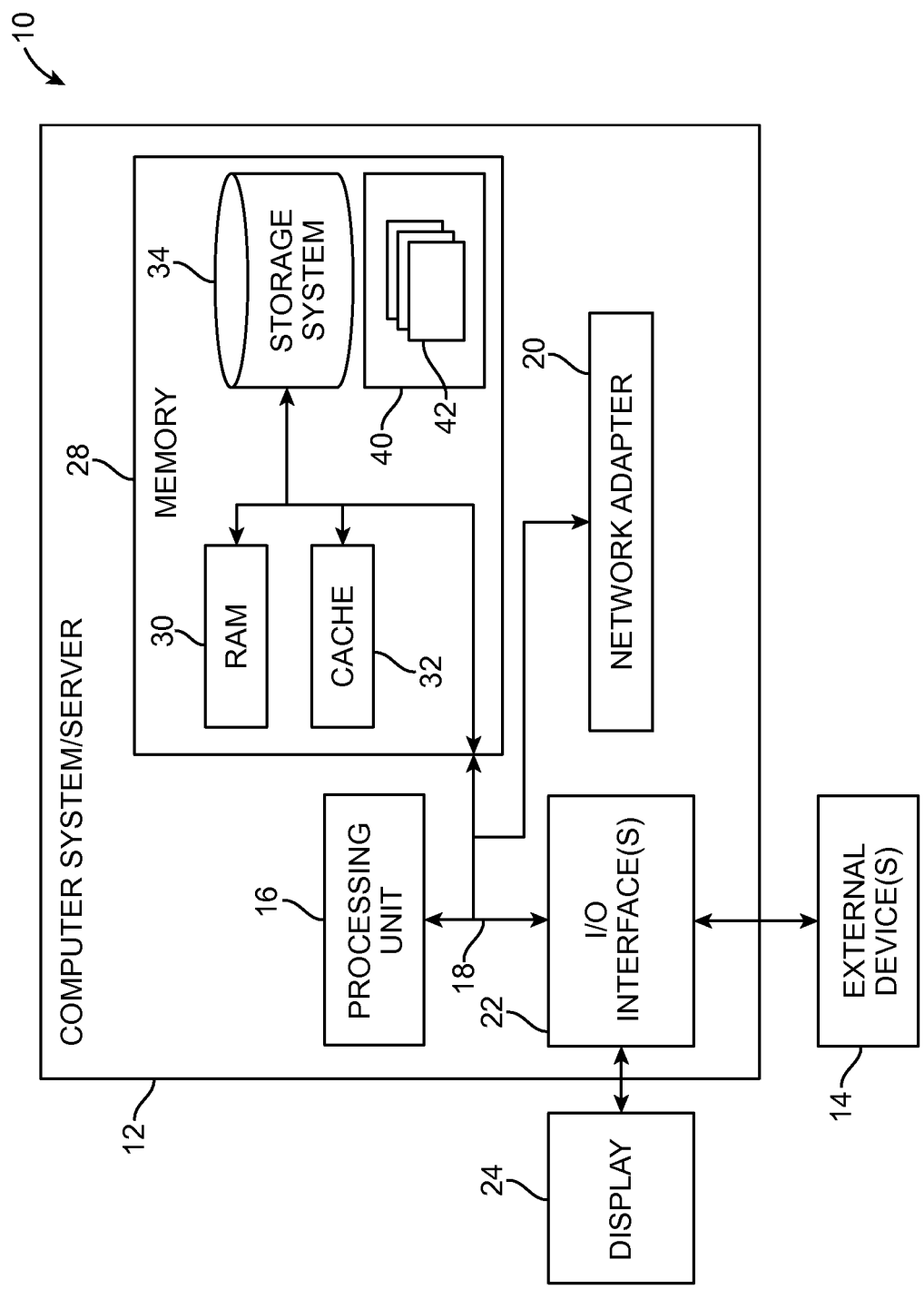
FIG. 1 illustrates a block diagram of an example cloud computing node, in accordance with an embodiment of the invention.

Embodiments of the invention relate to overlay virtual environments, and in particular, quantized congestion notification (QCN) in a virtual networking system. One embodiment provides a method for quantized congestion notification in a virtual networking system comprising multiple virtual networks. Each virtual network comprises at least one virtual machine configured to generate one or more packet flows. Each packet of each packet flow is tagged with a congestion notification tag including a corresponding virtual flow identifier of the packet flow. Each packet flow is mapped to a corresponding tunnel end point, wherein each packet of the packet flow is distributed via the corresponding tunnel end point. A congestion notification message is generated for each congestion point associated with each packet flow, wherein the congestion notification message comprises a virtual congestion point identifier of the congestion point and a source address of a virtual machine contributing to packet congestion at the congestion point. Each congestion point is mapped to a corresponding tunnel end point, wherein each congestion notification message for the congestion point is distributed via the corresponding tunnel end point, and wherein the corresponding virtual tunnel end point forwards the congestion notification message to a virtual machine contributing to packet congestion at the congestion point.

Another embodiment provides a virtual networking system comprising multiple virtual networks. Each virtual network comprises at least one virtual machine configured to generate one or more packet flows. Each virtual network comprises a physical network interface card (NIC) including a traffic management module configured for tagging each packet of each packet flow generated by each virtual machine of the virtual network with a congestion notification tag including a corresponding virtual flow identifier of the packet flow. The traffic management module is further configured for mapping each packet flow to a corresponding tunnel end point of the virtual network, wherein each packet of the packet flow is distributed via the corresponding tunnel end point. The traffic management module is further configured for generating a congestion notification message for each congestion point associated with each packet flow, wherein the congestion notification message comprises a virtual congestion point identifier of the congestion point and a source address of a virtual machine contributing to packet congestion at the congestion point. The traffic management module is further configured for mapping each congestion point to a corresponding tunnel end point, wherein each congestion notification message for the congestion point is distributed via the corresponding tunnel end point, and wherein the corresponding virtual tunnel end point forwards the congestion notification message to a virtual machine contributing to packet congestion at the congestion point.

Another embodiment provides a computer program product for quantized congestion notification in a virtual networking system comprising multiple virtual networks, wherein each virtual network comprises at least one virtual machine configured to generate one or more packet flows. The computer program product comprises a computer-readable storage medium having program code embodied therewith, the program code being executable by a computer to tag each packet of each packet flow with a congestion notification tag including a corresponding virtual flow identifier of the packet flow. Each packet flow is mapped to a corresponding tunnel end point, wherein each packet of the packet flow is distributed via the corresponding tunnel end point. The program code is further executable by the computer to generate a congestion notification message for each congestion point associated with each packet flow, wherein the congestion notification message comprises a virtual congestion point identifier of the congestion point and a source address of a virtual machine contributing to packet congestion at the congestion point. Each congestion point is mapped to a corresponding tunnel end point, wherein each congestion notification message for the congestion point is distributed via the corresponding tunnel end point, and wherein the corresponding virtual tunnel end point forwards the congestion notification message to a virtual machine contributing to packet congestion at the congestion point.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 illustrates a block diagram of an example cloud computing node 10, in accordance with an embodiment of the invention. The cloud computing node 10 illustrated in FIG. 1 is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

The cloud computing node 10 comprises a computer system/server 12 that is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

The components of the computer system/server 12 may include, but are not limited to, one or more processors or processing units 16, a system memory 28, and a bus 18 that couples various system components (e.g., the system memory 28 and the processor 16). The bus 18 represents one or more types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

A program/utility 40 including at least one program module 42 may be stored in the system memory 28 by way of example, and not limitation, as well as an operating system, one or more application programs, other program modules, and program data. Each of the operating systems, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, one or more devices that enable a consumer to interact with the computer system/server 12, and/or any devices (e.g., network card, modem, etc.) that enable the computer system/server 12 to communicate with one or more other computing devices. Such communication can occur via I/O interfaces 22. Still yet, the computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
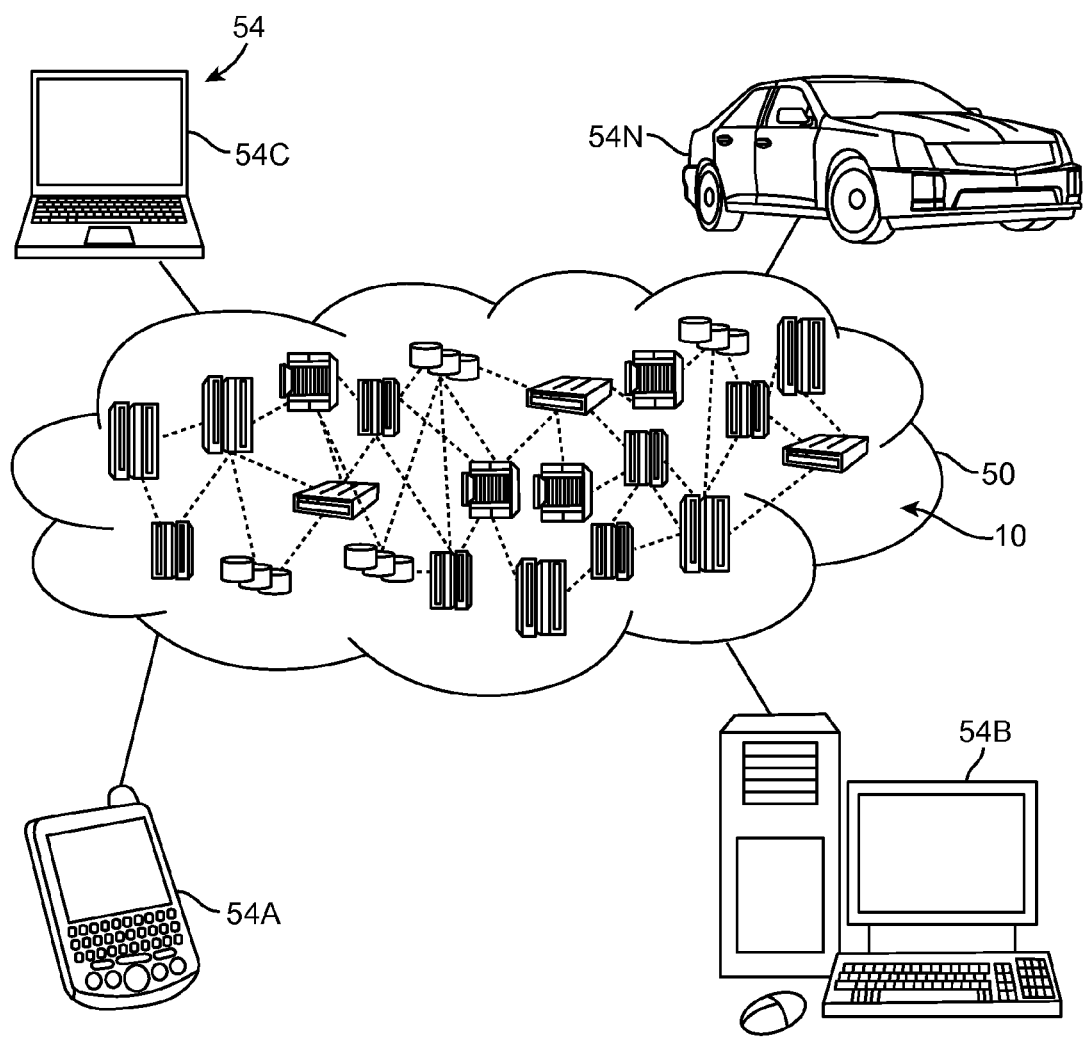
FIG. 2 illustrates an example cloud computing environment, in accordance with an embodiment of the invention.

FIG. 2 illustrates an example cloud computing environment 50, in accordance with an embodiment of the invention. Referring now to FIG. 2, illustrative cloud computing environment 50 is depicted. The cloud computing environment 50 comprises one or more cloud computing nodes 10 with which local computing devices 54 used by cloud consumers, such as, for example, a personal digital assistant (PDA) or a cellular telephone 54A, a desktop computer 54B, a laptop computer 54C, and/or an automobile computer system 54N may communicate. The nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
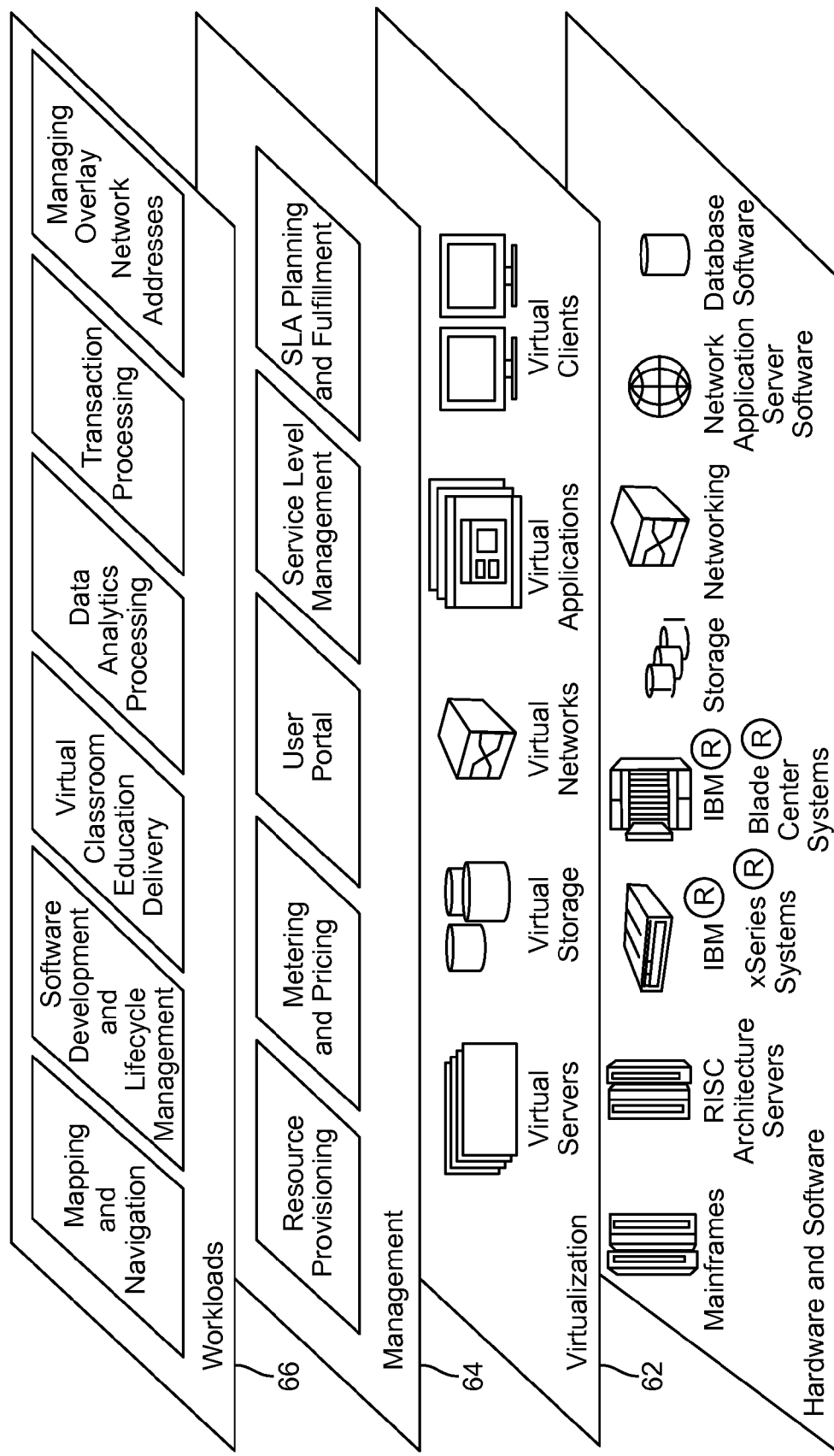
FIG. 3 illustrates abstraction model layers of a cloud computing environment, in accordance with an embodiment of the invention.

FIG. 3 illustrates abstraction model layers of a cloud computing environment 50, in accordance with an embodiment of the invention. Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and encapsulation mapping and communication. As mentioned above, all of the foregoing examples described with respect to FIG. 3 are illustrative only, and the invention is not limited to these examples.

It is understood all functions of the present invention as described herein are typically performed by a network independent network interface system which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention relate to providing interoperability between hosts supporting multiple encapsulation. One embodiment includes a method that includes mapping packet encapsulation protocol type information for virtual switches. Each virtual switch is associated with one or more virtual machines (VMs). In one embodiment, it is determined whether one or more common encapsulation protocol types exist for a first VM associated with a first virtual switch and a second VM associated with a second virtual switch based on the mapping. In one embodiment, a common encapsulation protocol type is selected if it is determined that one or more common encapsulation protocol types exist for the first virtual switch and the second virtual switch. A packet is encapsulated for communication between the first VM and the second VM using the selected common encapsulation protocol type.

Figure 4:
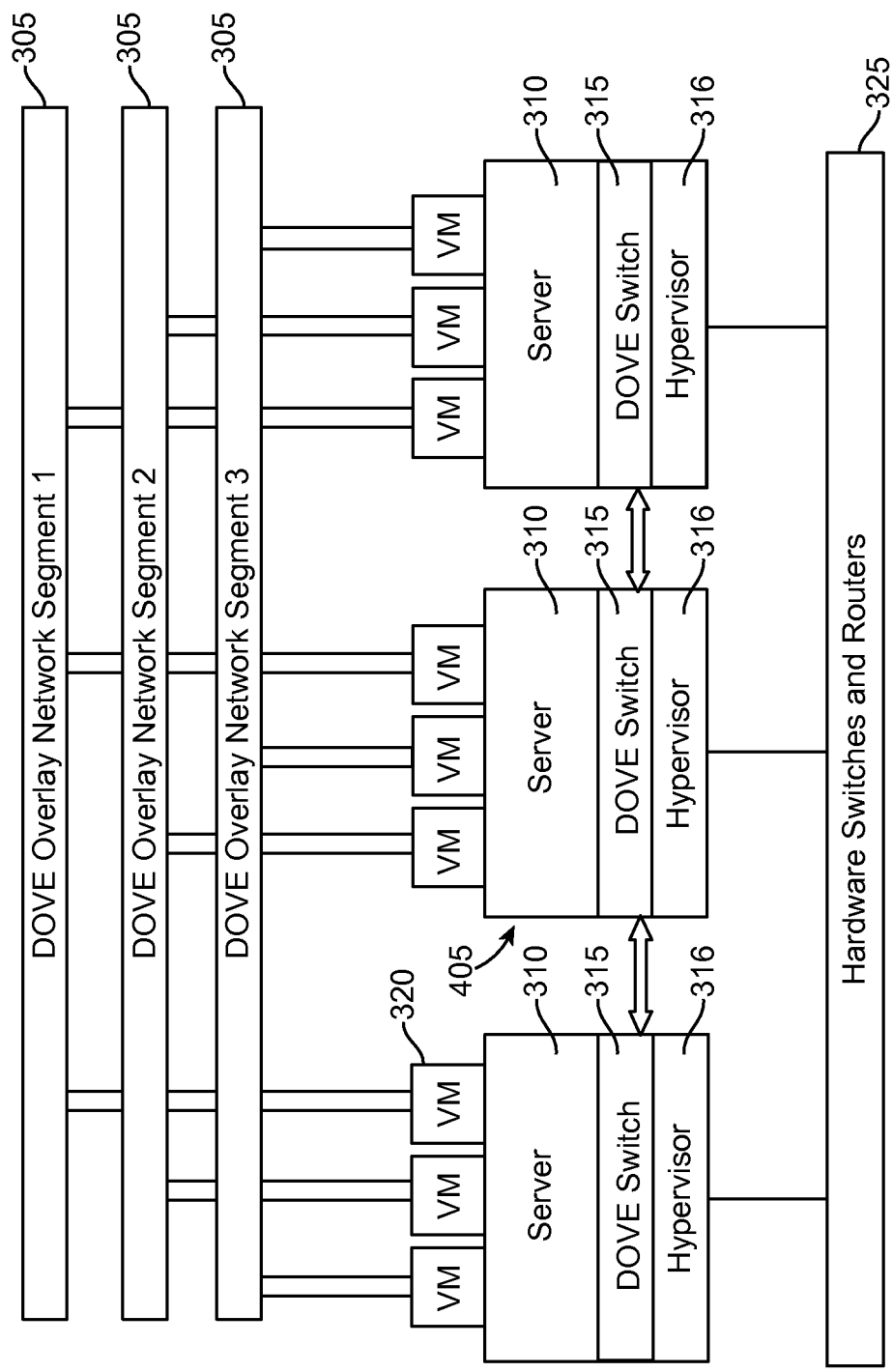
FIG. 4 shows a block diagram illustrating a distributed overlay virtual environment 400 for employing an embodiment of the present invention.

FIG. 4 shows a block diagram illustrating a distributed overlay virtual environment 400 for employing an embodiment of the present invention. In one embodiment, the distributed overlay virtual environment 400 may comprise a distributed overlay virtual Ethernet (DOVE) network system. The distributed overlay virtual environment 400 includes multiple virtual systems (or networks) 405 (also known as DOVE modules in one embodiment). Each virtual system 405 comprises a server 310 (or host) including a hypervisor 316 for creating and running at least one VM 320. Each hypervisor 316 includes at least one virtual switch 315 providing overlay functionality (e.g., DOVE functionality). The virtual system 405 overlays a physical layer 325 (e.g., including physical hardware and software processes) that may include physical switches, routers, servers, gateways, firewalls, etc. The physical layer 325 may also be referred to as the under layer. The virtual system 405 interoperates with existing hardware mechanisms, such as physical switches, routers, servers, gateways, firewalls, etc.

In one embodiment, overlay network segments 1-N 305 (e.g., overlay network segments 1-3) connect the multiple systems for communication of the different elements (e.g., hypervisors 316, VMs 320), where N is a positive number (e.g., 2, 3, 5, 10, etc.). It should be noted that while three systems 405 are shown, more (or less) systems 405 may be included in the distributed overlay virtual environment 400. In one embodiment, the virtual switches 315 comprise DOVE switches.

In one embodiment, the overlay network segments 1-N 305 create overlay networks between the hypervisors 316 and use encapsulation of packets, where outgoing packets originating from one VM 320 are encapsulated (e.g., adding overlay and physical network headers) and the physical layer 325 (underlay) is used to deliver to a server 310 where the target VM 320 resides. In one embodiment, in the physical layer 325 an outer header is used by physical switches to forward packets, where an overlay identification (ID) in an encapsulation header provides traffic isolation. Incoming packets to a virtual switch 315 of a destination server 310 are de-capsulated (e.g., the encapsulation headers are stripped from the packet) and delivered to a destination VM 320. Each virtual switch 315 is configured to provide overlay functionality. For example, in one embodiment, each virtual switch 315 is configured to encapsulate outgoing packets and de-capsulate incoming packets.

In one embodiment, address independence between different virtual systems 405 is supported. For example, two different VMs 320 operating in two different systems 405 may have the same Internet Protocol (IP) address and media access control (MAC) address. As another example, the systems 405 support deploying VMs 320, which belong to the same system 405, onto different hosts that are located in different physical subnets (includes switches and/or routers between the physical entities). In another embodiment, VMs 320 belonging to different systems 405 may be hosted on the same physical host. In yet another embodiment, the systems 405 support VM 320 migration anywhere in a data center without changing the VM 320 network address and losing its network connection.

In one embodiment, the systems 405 encapsulate data with physical path translations based upon policies (e.g., from a distributed policy service (DPS)), and send the encapsulated data between systems 405 that, in turn, is de-capsulated and forwarded to a destination VM 320. In one embodiment, the policies describe, in a logical manner, how data is required to be sent over virtual networks without details of the underlying physical entities that performs particular tasks.

In one embodiment, the hypervisors 316 (e.g., VM 320 managers) allow multiple operating systems (e.g., VMs, such as VMs 320) to run concurrently on a host computer. A hypervisor 316 provides abstraction of physical resources to the VMs 320. For example, a physical network interface card (NIC) may be abstracted as a virtual NIC (vNIC) of a system 405. In one embodiment, a virtual switch 315 is a software abstraction of an Ethernet switch in the hypervisor 316 for providing connectivity for VMs 320.

Figure 5:
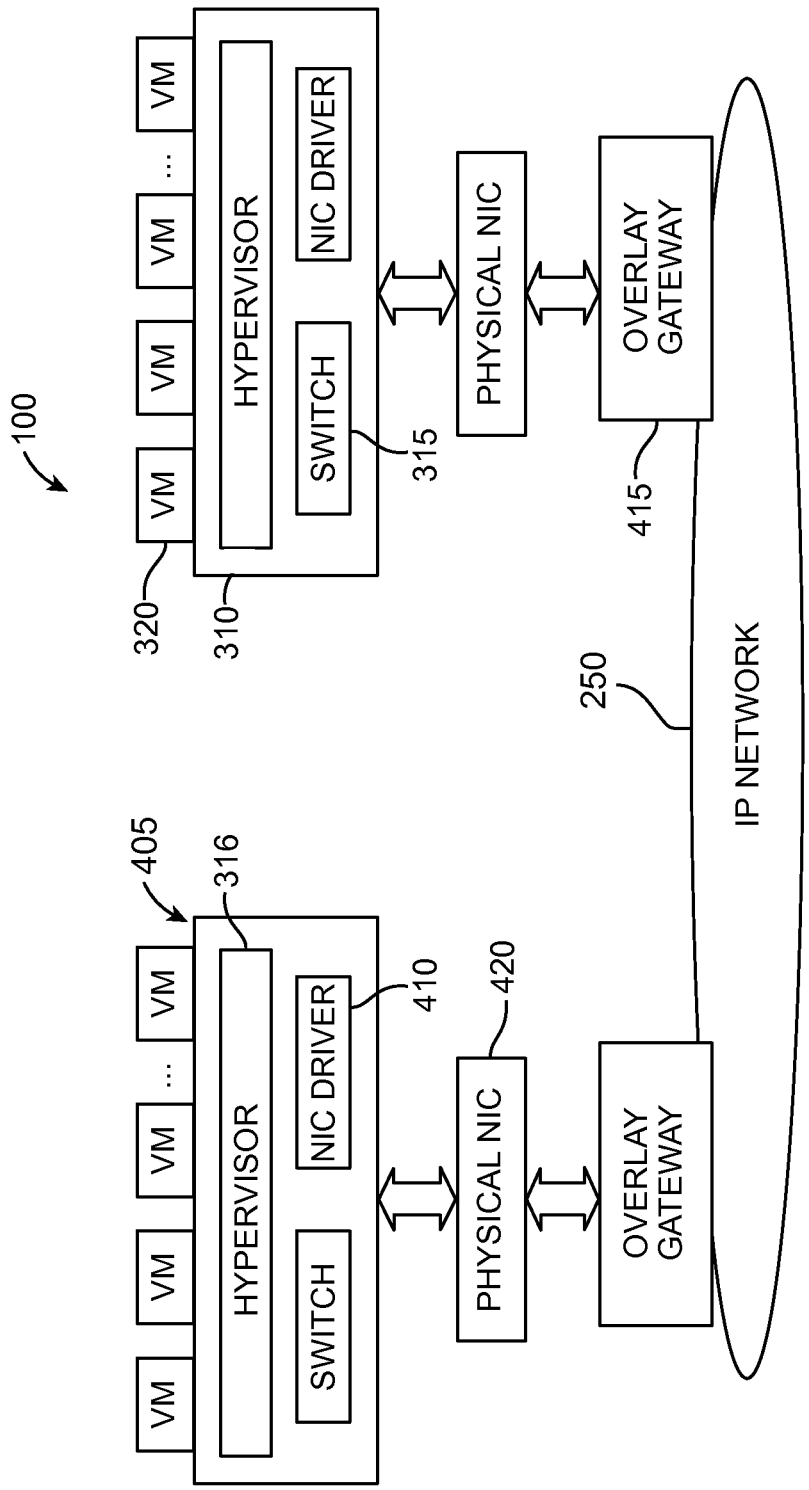
FIG. 5 illustrates packet distribution in a virtual networking system, in accordance with an embodiment of the invention.

FIG. 5 illustrates packet distribution in a virtual networking system 100, in accordance with an embodiment of the invention. The system 100 comprises multiple virtual networks (systems) 405. Each virtual network 405 comprises at least one server (host) 310 on which a hypervisor 316 is running. The hypervisor 316 creates and runs one or more virtual machines 320.

Each virtual machine 320 of a virtual network 405 may receive an incoming packet from, and/or send an outgoing packet to, another virtual machine 320. In one embodiment, physical network interface controller (NIC) devices 420 are utilized to facilitate packet distribution between different virtual networks 405 via an IP network 250. Each virtual network 405 has a corresponding physical NIC device 420 that connects the virtual network 405 to the IP network 250 via an overlay gateway 415.

Each virtual network 405 comprises at least one DOVE switch 315 for processing incoming packets and outgoing packets. A DOVE switch 315 of a virtual network 405 is configured to receive an outgoing packet from a virtual machine 320 of the virtual network 405. In one embodiment, the DOVE switch 315 tags the outgoing packet with a corresponding virtual networking tag (e.g., a VLAN tag). The DOVE switch 315 sends the outgoing packet to a corresponding physical NIC device 420 for the virtual network 405. The DOVE switch 315 is further configured to receive an incoming packet from the physical NIC device 420. Upon receiving the incoming packet, the DOVE switch 315 determines which virtual machine 320 the incoming packet targets, and sends the incoming packet to the target virtual machine 320.

Each virtual network 405 further comprises a NIC driver 410 for communicating with a corresponding physical NIC 420 for the virtual network 405.

Figure 6:
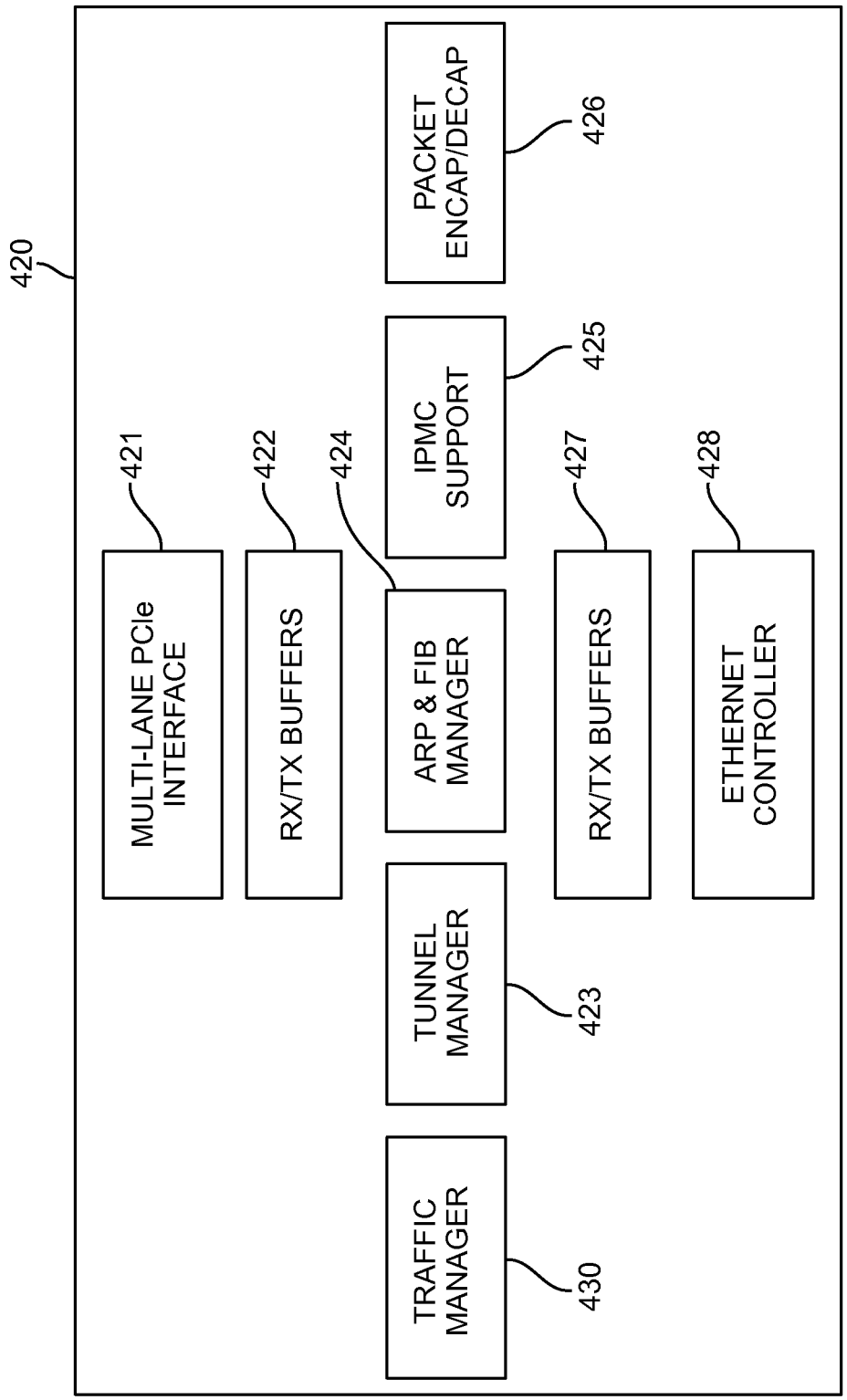
FIG. 6 is a block diagram of a physical NIC device in FIG. 5, in accordance with an embodiment of the invention.

FIG. 6 is a block diagram of a physical NIC device 420 in FIG. 5, in accordance with an embodiment of the invention. Unlike in FIG. 4 where overlay functionality is provided by virtual server side software (i.e., a hypervisor 316), overlay functionality in FIG. 6 is offloaded on to the physical NIC device 420. The physical NIC device 420 comprises at least the following components that support overlay tunneling capabilities: a multi-lane peripheral component interconnect express (PCIe) interface module 421, a first set of receive/transmit (RX/TX) buffers 422, a tunnel manager module 423, an address resolution protocol (ARP) and forwarding information base (FIB) manager module 424, an Internet Protocol Multimedia Communications (IPMC) support module 425, a packet encapsulation/de-capsulation module 426, a second set of RX/TX buffers 427, an Ethernet controller 428, and a traffic manager module 430.

The multi-lane PCIe interface module 421 is a CPU interface that receives and transmits packets between a server 310 and the physical NIC device 420, programs control parameters for the physical NIC device 420, and reads statistics and the control parameters for the physical NIC device 420.

The first set of RX/TX buffers 422 buffer packets between a server 310 and the physical NIC device 420. The second set of RX/TX buffers 427 buffers packets between the physical NIC device 420 and an overlay gateway 415.

Each outgoing packet from a virtual network 405 is encapsulated with supplemental data, such as a physical network header, before distribution to another virtual network via the IP network 250. The tunnel manager module 423 determines data that each outgoing packet is encapsulated with, such as a source MAC and a destination MAC.

The ARP and FIB manager module 424 resolves network layer addresses into link layer addresses based on a telecommunications protocol (e.g., IPv4 over IEEE 802.3 and IEEE 802.11). The ARP and FIB manager module 424 also maintains a forwarding table including packet routing information.

The IPMC support module 425 maps a broadcast domain of each overlay network to an underlay network multicast group, thereby resolving ARP and other broadcast oriented protocols.

The packet encapsulation/de-capsulation module 426 encapsulates each outgoing packet before sending the outgoing packet to another virtual network 405 via the IP network 250. The IP network 250 propagates encapsulated packets between different virtual networks 405. The packet encapsulation/de-capsulation module 426 also de-capsulates each incoming packet received from another virtual network 405 via the IP network 250.

The Ethernet controller 428 processes packets exchanged between the physical NIC device 420 and an overlay gateway 415.

As described in detail later herein, the traffic manager application module 430 facilitates quantized congestion notification (QCN).

Figure 7:
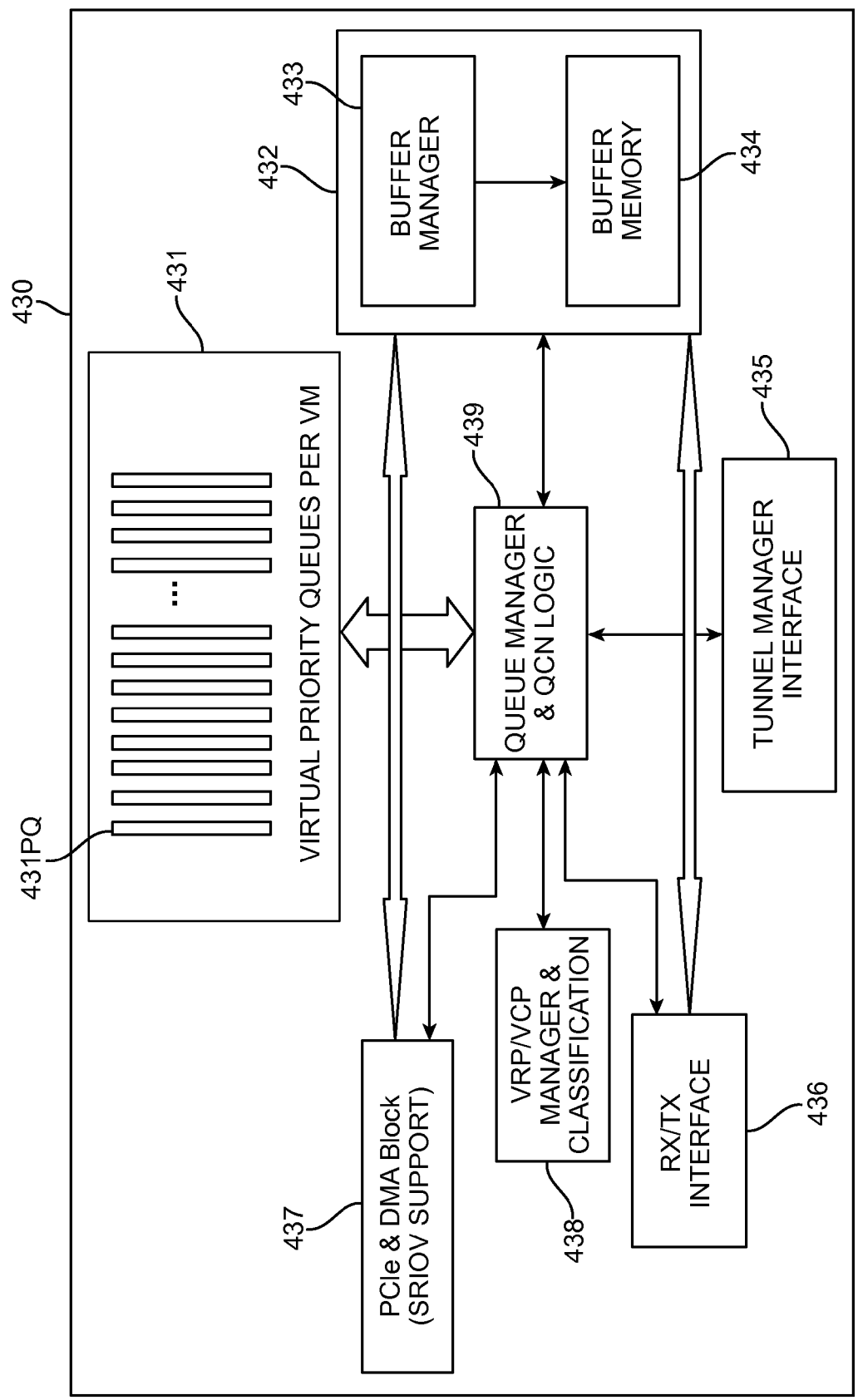
FIG. 7 is a block diagram of a traffic manager application module in FIG. 6, in accordance with an embodiment of the invention.

FIG. 7 is a block diagram of a traffic manager application module 430 in FIG. 6, in accordance with an embodiment of the invention. The traffic manager application module 430 facilitates QCN for a virtualized environment running on a server 310, such as a virtual network 405.

A virtual congestion point (VCP) represents a resource of the virtual networking system 100 that becomes congested as a result of a heavy volume of packets being distributed across said VCP from a virtual tunnel end point (VTEP) 450. For example, a VCP may be a set of QCN enabled virtual priority queues 431 for a virtual machine 320, wherein the set 431 is maintained either on a server 310 (e.g., in a DOVE switch 315) or on a physical NIC device 420 with overlay tunneling capabilities. Each VCP is associated with at least one VTEP 450. Each VTEP 450 is configured to receive traffic from a physical overlay gateway switch via the physical NIC device 420, and forward the traffic to a VCP associated with the VTEP 450.

Each VCP is configured with QCN settings. If a VCP is congested with traffic, the VCP sends CNMs back to sources of traffic that are contributing to the congestion. A source may be a physical reaction point (RP) or a virtual reaction point (VRP) in the same overlay network.

A virtual reaction point (VRP) represents a source and sink of traffic generation that injects one or more flows of data (e.g., packets) into the virtual networking system 100. For example, a VRP may be a set of QCN enabled virtual priority queues 431 for a virtual machine 320, wherein the set 431 is associated with a vNIC of the virtual machine 320. The traffic manager application module 430 utilizes congestion notification messages (CNM) to adjust the rate of injection of a flow of data for a VRP. As described in detail later herein, each VCP or physical congestion point (CP) generates a congestion notification message (CNM) targeting a VRP or a RP in the same overlay network causing congestion at the VCP or CP.

The traffic manager application module 430 comprises at least the following components: a set of virtual priority queues 431 for each virtual machine 320, a memory unit 432, a tunnel interface manager module 435, a RX/TX interface module 436, a PCIe and direct memory access (DMA) block module 437, a VRP/VCP manager and classification module 438, and a queue manager and QCN logic module 439.

The VRP/VCP manager and classification module 438 creates and manages virtual reaction point identifiers (VRPIDs). Each VRPID is a 16-bit identifier identifying a VRP in the virtual networking system 100. A VRPID maps to a flow identifier defined by a QCN standard (e.g., IEEE 802.1Qau).

A VRP may have one or more VRPIDs (i.e., flow identifiers). A VRP generating multiple flows of packets may have multiple VRPIDs, wherein each VRPID corresponds to a flow generated by the VRP. A VRP allocates separate queuing and buffering resources to each VRPID associated with a flow.

Specifically, the VRP/VCP manager and classification module 438 assigns each virtual machine 320 of a corresponding virtual network 405 with at least one corresponding VRPID. Each VRPID maps to a flow identifier or reaction point identifier (RPID) defined by a QCN standard (e.g., IEEE 802.1Qau). The queue manager and QCN logic module 439 classifies packets based on VRPIDs.

The VRP/VCP manager and classification module 438 also creates and manages virtual congestion point identifiers (VCPIDs). Each VCPID is a 64-bit identifier identifying a VCP in the virtual networking system 100. Specifically, the VRP/VCP manager and classification module 438 assigns each VCP in a corresponding virtual network 405 with a corresponding VCPID. Each VCPID maps to a congestion point identifier (CPID) defined by a QCN standard (e.g., IEEE 802.1Qau).

Each set of virtual priority queues 431 for a virtual machine 320 comprises multiple virtual priority queues 431PQ. In one embodiment, a virtual machine 320 may be assigned multiple VRPIDs since the traffic manage module 430 supports multiple virtual priority queues 431PQ for the virtual machine 320.

The queue manager and QCN logic module 439 performs queuing and dequeuing operations on packets. Specifically, the queue manager and QCN logic module 439 assigns one or more virtual priority queues 431PQ to each virtual machine 320 of a corresponding virtual network 405. The queueing and buffering resources may be maintained in the server 310 (e.g., a DOVE switch 315) or in the physical NIC device 420.

The queue manager and QCN logic module 439 also facilitates QCN on each virtual priority queue 431PQ. Specifically, for each virtual priority queue 431PQ, the queue manager and QCN logic module 439 tags each outgoing packet generated by a virtual machine 320 with a congestion notification (CN) tag that includes a corresponding VRPID for the virtual machine 320.

The queue manager and QCN logic module 439 also samples frames on each virtual priority queue 431PQ based on pre-programmed QCN logic. For each virtual priority queue 431PQ that is congested based on the sampling, the queue manager and QCN logic module 439 generates a CNM targeting a VRPID or RPID included in the CN tags of the packets contributing to the congestion.

The queue manager and QCN logic module 439 also processes CNMs generated by VCPs along a path of the virtual networking system 100 that an incoming packet targeting a virtual machine 320 of the corresponding virtual network 405 traverses. The queue manager and QCN logic module 439 decodes each CNM and determine a VRP contributing to the congestion based on a VRPID included in the CNM, and forwards the CNM to a virtual machine 320 with the VRPID, wherein a Virtual Reaction Point Transmit (TX) Logic of the virtual machine 320 adjusts a corresponding rate of packet generation (e.g., reduce the rate of outgoing packets generated) based on the CNM received.

The tunnel manager interface module 435 interfaces the tunnel manager module 423 of the physical NIC device 420 with the queue manager and QCN logic module 439, such that the queue manager and QCN logic module 439 may receive tunneling parameters for each packet and determine a corresponding VCPID or VCPID for the packet.

The memory unit 432 comprises a buffer manager 433 and a buffer memory 434. The buffer manager 433 manages the buffer memory 434. Specifically, the buffer manager 433 divides the buffer memory 434 into multiple buffers (of a fixed size or a variable size) based at least in part on maximum transmission unit (MTU) size and buffer size requirements.

Each buffer has a corresponding buffer header managed by the buffer manager 433. For every packet received, the buffer manager 433 allocates one or more buffers to the queue manager and QCN logic module 439. The buffer manager 433 can also reclaim one or more buffers from the queue manager and QCN logic module 439. The buffer manager 433 tracks statistics relating to the buffers, such as how many buffers are free and how many buffers are used.

The RX/TX interface represent physical interface for receiving and transmitting logic.

The PCIe and direct memory access (DMA) block module 437 is a CPU interface that receives and transmits packets between a server 310 and a physical NIC device 420, programs control parameters for the physical NIC device 420, and reads statistics and the control parameters for the physical NIC device 420.

In one embodiment, for each outgoing packet with a corresponding CN tag, the queue manager and QCN logic module 439 replicates/copies the CN tag into an outermost encapsulation packet for the outgoing packet. Specifically, the queue manager and QCN logic module 439 receives tunneling parameters for the outgoing packet (e.g., parameters relating to a tunnel end point through which the outgoing packet is distributed) from the tunnel manager module 423 via the tunnel manager interface module 435. Based on the tunneling parameters received, the queue manager and QCN logic module 439 determines data to be included in the outermost encapsulation packet, such as a source MAC address for a tunnel end point that forwards the packet, and a destination MAC address for a tunnel end point that the packet is forwarded to. The queue manager and QCN logic module 439 then inserts a copy of the CN tag into the outermost encapsulation packet. Therefore, the outgoing packet has two CN tags, that an innermost CN tag (i.e., the CN tag in the outgoing packet) and an outermost CN tag (i.e., the CN tag in the outermost encapsulation packet that the outgoing packet is encapsulated with).

Non-overlay congestion points (e.g., physical switches/routers 325 of the IP network 250) that inspect only the outermost encapsulation packet for the outgoing packet may process the outermost CN tag. Overlay congestion points (e.g., DOVE switches 315, physical NIC devices 420) that can inspect the innermost packet of the outgoing packet may process the innermost CN tag.

Figure 8:
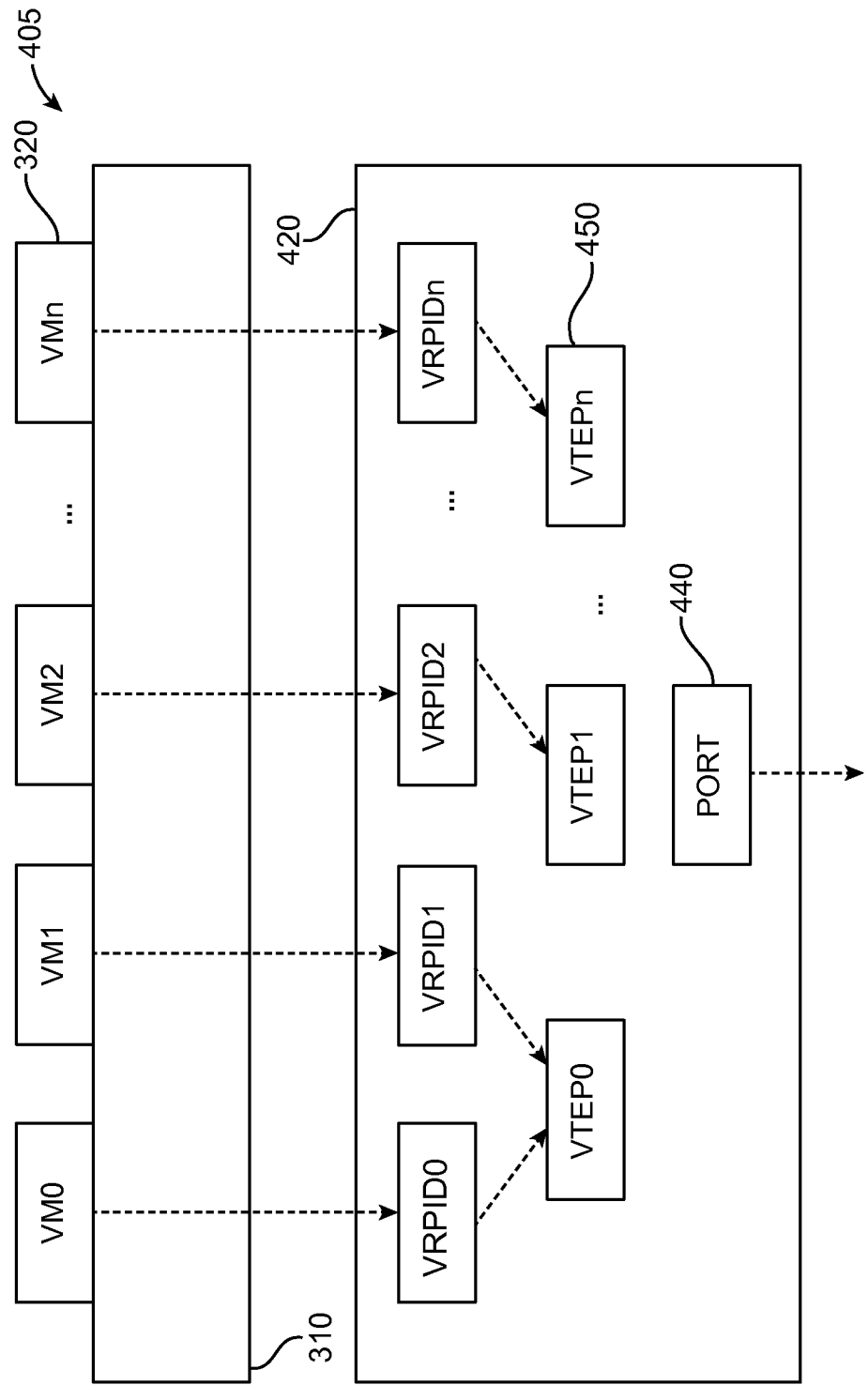
FIG. 8 illustrates processing of outgoing packets generated by a virtual network in FIG. 5, in accordance with an embodiment of the invention.

FIG. 8 illustrates processing of outgoing packets generated by a virtual network 405 in FIG. 5, in accordance with an embodiment of the invention. A virtual network 405 may comprise multiple virtual machines 320 running on a server 310, such as virtual machines VM0, VM1, VM2, . . . , and VMn. A corresponding physical NIC device 420 for the virtual network 405 assigns a VRPID to each flow of packets originating from each virtual machine 320.

For example, as shown in FIG. 8, the physical NIC device 420 assigns VRPID0 to a flow of packets generated by virtual machine VM0, VRPID1 to a flow of packets generated by virtual machine VM1, VRPID2 to a flow of packets generated by virtual machine VM2, . . . , and VRPIDn to a flow of packets generated by virtual machine VMn.

The physical NIC device 420 encapsulates each outgoing packet based on tunneling parameters for the outgoing packet (e.g., parameters relating to a VTEP 450 that forwards the outgoing packet to the IP network 250).

Each packet coming out of a VTEP 450 is demultiplexed to a corresponding VRPID or VCPID. Specifically, each VRPID and each VCPID is mapped to a corresponding VTEP 450.

For example, as shown in FIG. 8, VRPID0 and VRPID1 are mapped to VTEP0, VRPID2 is mapped to VTEP1, . . . , and VRPIDn is mapped to VTEPn. Therefore, each outgoing packet of a flow assigned with either VRPID0 or VRPID1 is encapsulated with a source MAC address of VTEP0, each outgoing packet of a flow assigned with VRPID2 is encapsulated with a source MAC address of VTEP1, and each outgoing packet of a flow assigned with VRPIDn is encapsulated with a source MAC address of VTEPn.

A CNM generated by an overlay CP (e.g., a DOVE switch 315, a physical NIC device 420) includes a VRPID and a source MAC address for a virtual machine 320 contributing to congestion at the overlay CP. A CNM generated by a non-overlay CP (e.g., a physical switch/router 325 of the IP network 250) includes a VRPID and a source MAC address for a virtual tunnel end point contributing to congestion at the non-overlay CP.

The physical NIC device 420 further comprises a port 440 for exchanging packets with the IP network 250 via an overlay gateway 415.

Figure 9A:
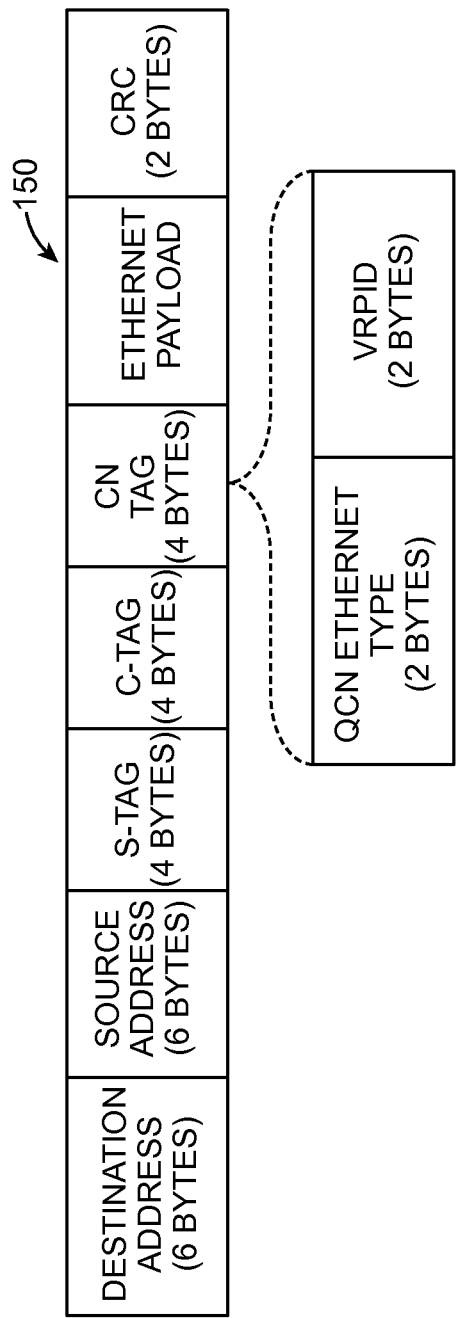
FIG. 9A illustrates an example packet, in accordance with an embodiment of the invention.

FIG. 9A illustrates an example packet 150, in accordance with an embodiment of the invention. The packet 150 comprises at least the following information: a destination address identifying a destination for the packet (e.g., a MAC address of a virtual machine 320 that the packet is sent/broadcast to), a source address identifying a source for the packet (e.g., a MAC address of a virtual machine 320 that generated the packet), a S-tag (e.g., a 802.1Q VLAN tag), a C-tag, a CN tag, Ethernet payload information including data that the packet is carrying, and cyclic redundancy check (CRC) information.

In one embodiment, the CN tag comprises a QCN Ethernet type identifier and a VRPID identifying a VRP that generated the packet. In one embodiment, the destination address is 6 bytes in length, the source address is 6 bytes in length, the S-tag is 4 bytes in length, the C-tag is 4 bytes in length, the CN tag is 4 bytes in length including 2 bytes for the QCN Ethernet type and 2 bytes for the VRPID or flow identifier, and the CRC information is 2 bytes in length.

Figure 9B:
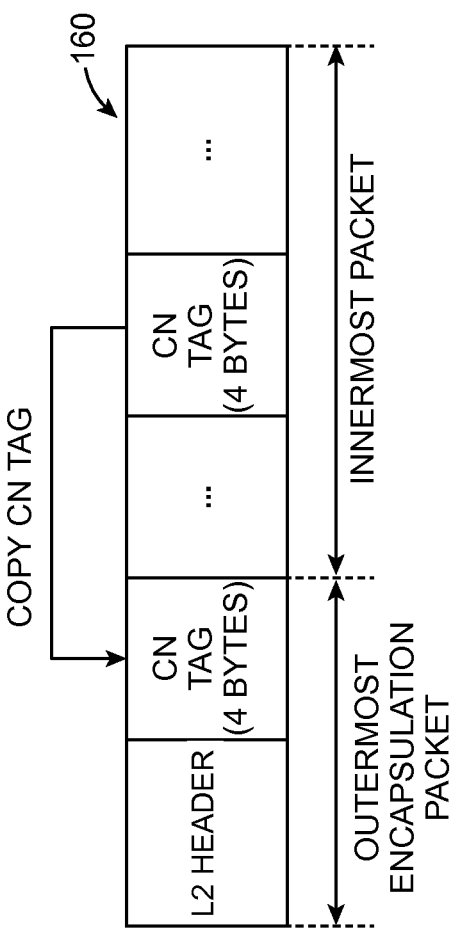
FIG. 9B illustrates an example encapsulated packet, in accordance with an embodiment of the invention.

FIG. 9B illustrates an example encapsulated packet 160, in accordance with an embodiment of the invention. Before each outgoing packet 150 is forwarded to the IP network 250, the physical NIC device 420 encapsulates the outgoing packet 150 with an outermost encapsulation packet including supplemental data such as a Layer 2 (L2) header.

For example, as shown in FIG. 9B, an encapsulated packet 160 comprises an outermost encapsulation packet including a L2 header, and an innermost packet including the information identified in FIG. 9A. The L2 header may include a destination address identifying a destination for the packet (e.g., a MAC address of a virtual tunnel end point that the packet is sent/broadcast to) and a source address identifying a source for the packet (e.g., a MAC address of a virtual tunnel end point that forwards the packet).

As another example, an encapsulated packet 160 comprises an outermost encapsulation packet including a L2 header and a Layer 3 (L3) header, and an innermost packet including the information identified in FIG. 9A In one embodiment, the physical NIC device 420 inserts a copy/replica of the CN tag in the innermost packet (i.e., the innermost CN tag) into the outermost encapsulation packet, thereby creating an outermost CN tag.

Non-overlay congestion points (e.g., physical switches/routers 325 of the IP network 250) that inspect only the outermost encapsulation packet for the outgoing packet may process the outermost CN tag. Overlay congestion points (e.g., DOVE switches 315, physical NIC devices 420) that can inspect the innermost packet of the outgoing packet may process the innermost CN tag.

Figure 10:
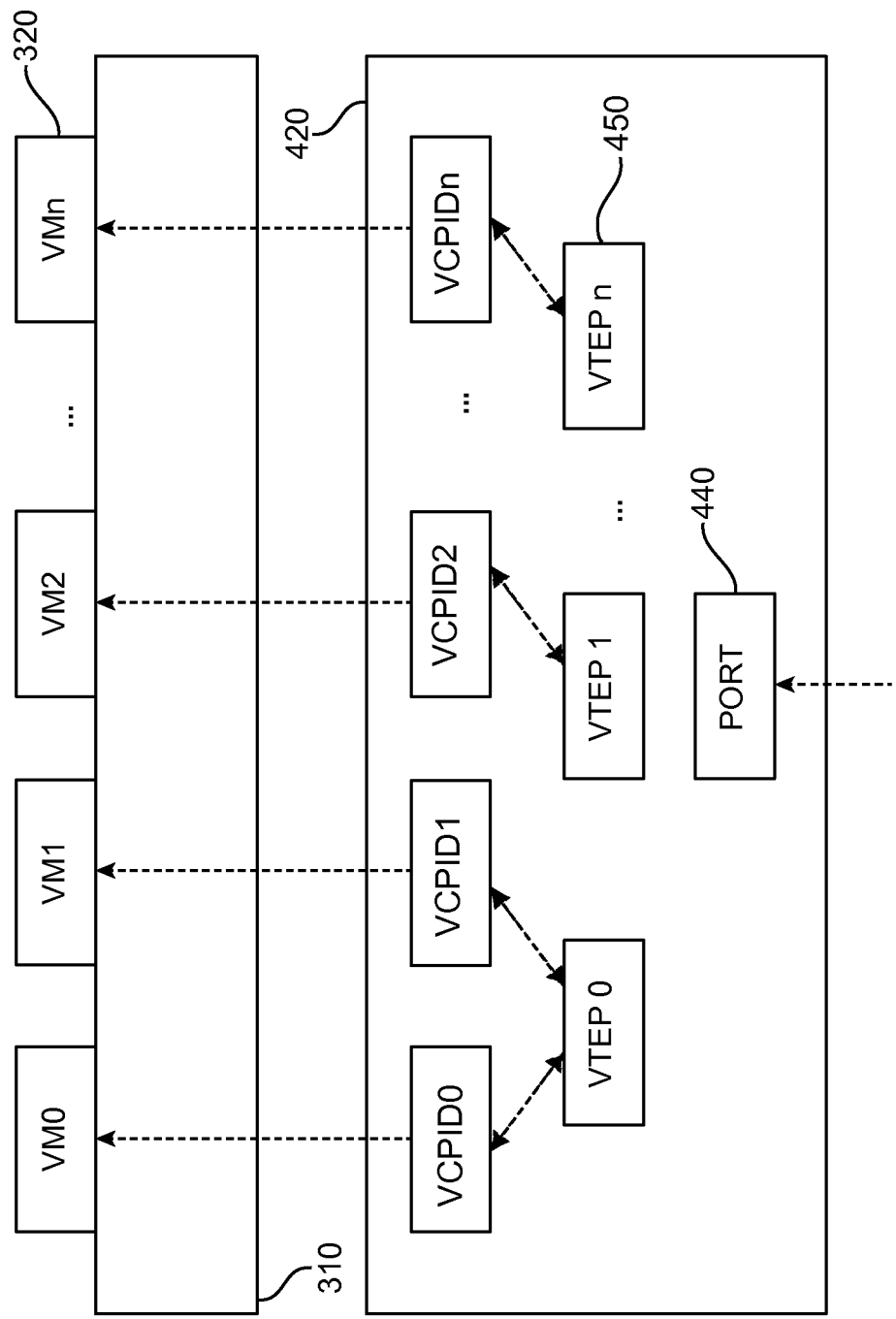
FIG. 10 illustrates VCPIDs for the virtual network 405 in FIG. 8, in accordance with an embodiment of the invention.

FIG. 10 illustrates VCPIDs for the virtual network 405 in FIG. 8, in accordance with an embodiment of the invention. The physical NIC device 420 receives incoming packets targeting different tunnel end points via the port 440. The physical NIC device 420 assigns a VCPID identifying one of the congestion points for each virtual machine 320. For example, as shown in FIG. 10, the physical NIC device 420 assigns virtual machines VM0, VM1, VM2, . . . , and VMn with congestion points with VCPIDs VCPID0, VCPID1, VCPID2, . . . , and VCPIDn, respectively.

Each VCPID is mapped to a corresponding VTEP 450. For example, as shown in FIG. 10, VCPID0 and VCPID1 are mapped to VTEP0, VCPID2 is mapped to VTEP1, . . . , and VCPIDn is mapped to VTEPn. Therefore, each outgoing packet associated with VCPID0 or VCPID1 is encapsulated with a source MAC address of VTEP0, each outgoing packet associated with VCPID2 is encapsulated with a source MAC address of VTEP1, and each outgoing packet associated with VCPIDn is encapsulated with a source MAC address of VTEPn.

Further, each incoming packet encapsulated with a source MAC address of VTEP0 is associated with either VCPID0 or VCPID1, each incoming packet encapsulated with a source MAC address of VTEP1 is associated with VCPID2, and each incoming packet encapsulated with a source MAC address of VTEPn is associated with VCPIDn.

Figure 11:
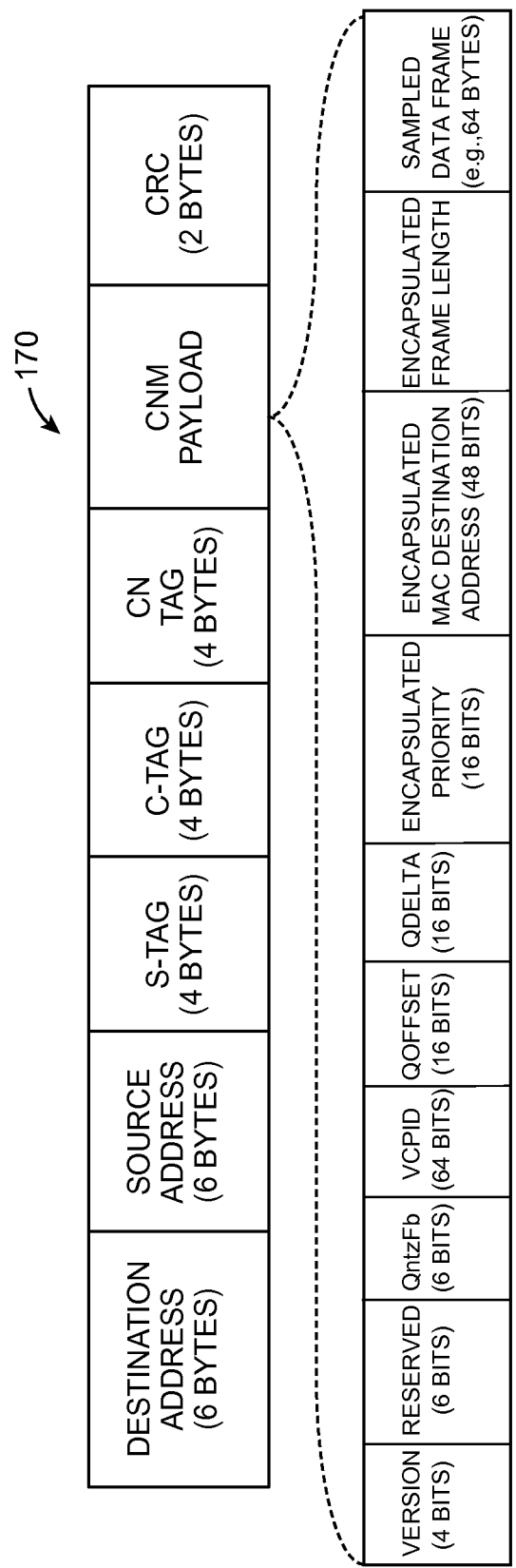
FIG. 11 illustrates an example CNM, in accordance with an embodiment of the invention.

FIG. 11 illustrates an example CNM 170, in accordance with an embodiment of the invention. The CNM 170 comprises at least the following information: a destination address identifying a destination for the CNM 170 (e.g., a MAC address of a virtual machine 320 that the CNM is sent/broadcast to), a source address identifying a source for the CNM (e.g., a MAC address of a congestion point that generated the CNM), a S-tag (e.g., a 802.1Q VLAN tag), a C-tag, a CN tag, CNM payload information, and cyclic redundancy check (CRC) information.

In one embodiment, the CNM payload information comprises a sampled data frame MAC service data unit (MSDU), encapsulated frame length information, encapsulated destination MAC address, encapsulated priority identifier, a Qdelta, a $Q_{offset}$, a VCPID identifying a congestion point, a QntzFb, a reserved identifier, and a version identifier.

In one embodiment, the destination address is 6 bytes in length, the source address is 6 bytes in length, the S-tag is 4 bytes in length, the C-tag is 4 bytes in length, the CN tag is 4 bytes in length, the sampled data frame MSDU is 64 bytes in length, the encapsulated destination MAC address is 48 bits in length, the encapsulated priority identifier is 16 bits in length, the Qdelta is 16 bits in length, $Q_{offset}$ is 16 bits in length, the VCPID is 64 bits in length, the QntzFb is 6 bits in length, the reserved identifier is 6 bits in length, the version identifier is 6 bits in length, and the CRC information is 2 bytes in length.

Figure 12:
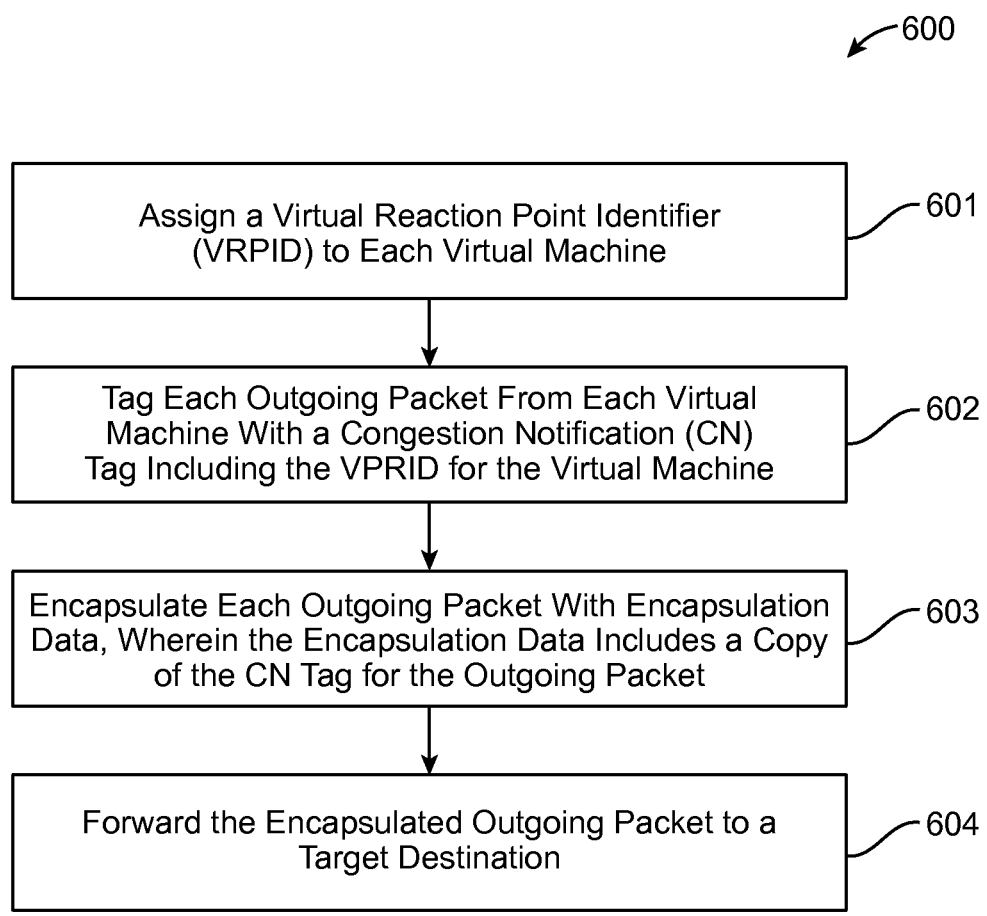
FIG. 12 illustrates a flowchart of an example process for processing outgoing packets generated by a virtual network including one or more virtual machines, in accordance with an embodiment of the invention.

FIG. 12 illustrates a flowchart of an example process 600 for processing outgoing packets generated by a virtual network including one or more virtual machines, in accordance with an embodiment of the invention. In process block 601, assign a VRPID to each virtual machine. In process block 602, tag each outgoing packet from each virtual machine with a CN tag including the VRPID for the virtual machine. In process block 603, encapsulate each outgoing packet with encapsulation data, wherein the encapsulation data includes a copy of the CN tag for the outgoing packet. In process block 604, forward the encapsulated outgoing packet to a target destination.

Figure 13:
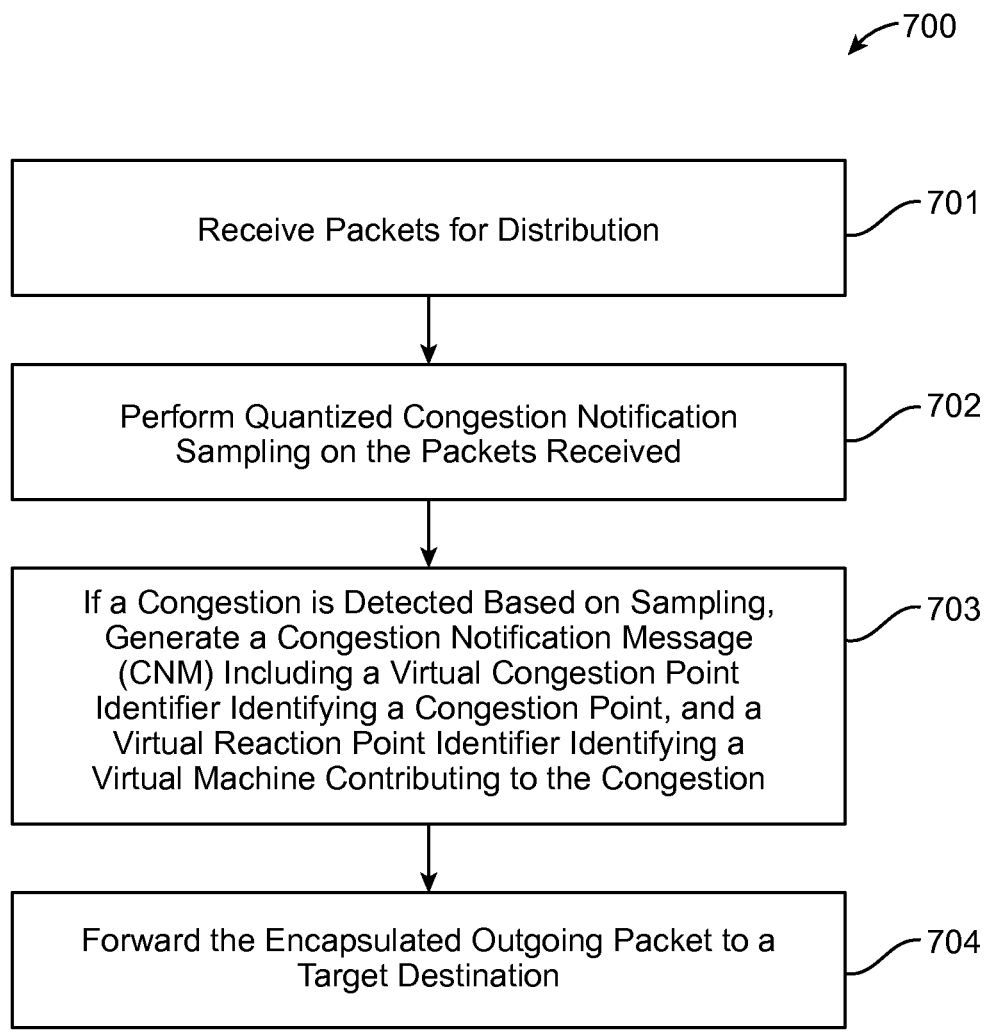
FIG. 13 illustrates a flowchart of an example process for generating CNMs, in accordance with an embodiment of the invention.

FIG. 13 illustrates a flowchart of an example process 700 for generating CNMs, in accordance with an embodiment of the invention. In process block 701, receive packets for distribution. In process block 702, perform QCN sampling on the packets received. In process block 703, if a congestion is detected based on sampling, generate a CNM including a VCPID identifying a CP, and a VRPID identifying a virtual machine contributing to the congestion. In process block 704, forward the CNM to the virtual machine contributing to the congestion.

Figure 14:
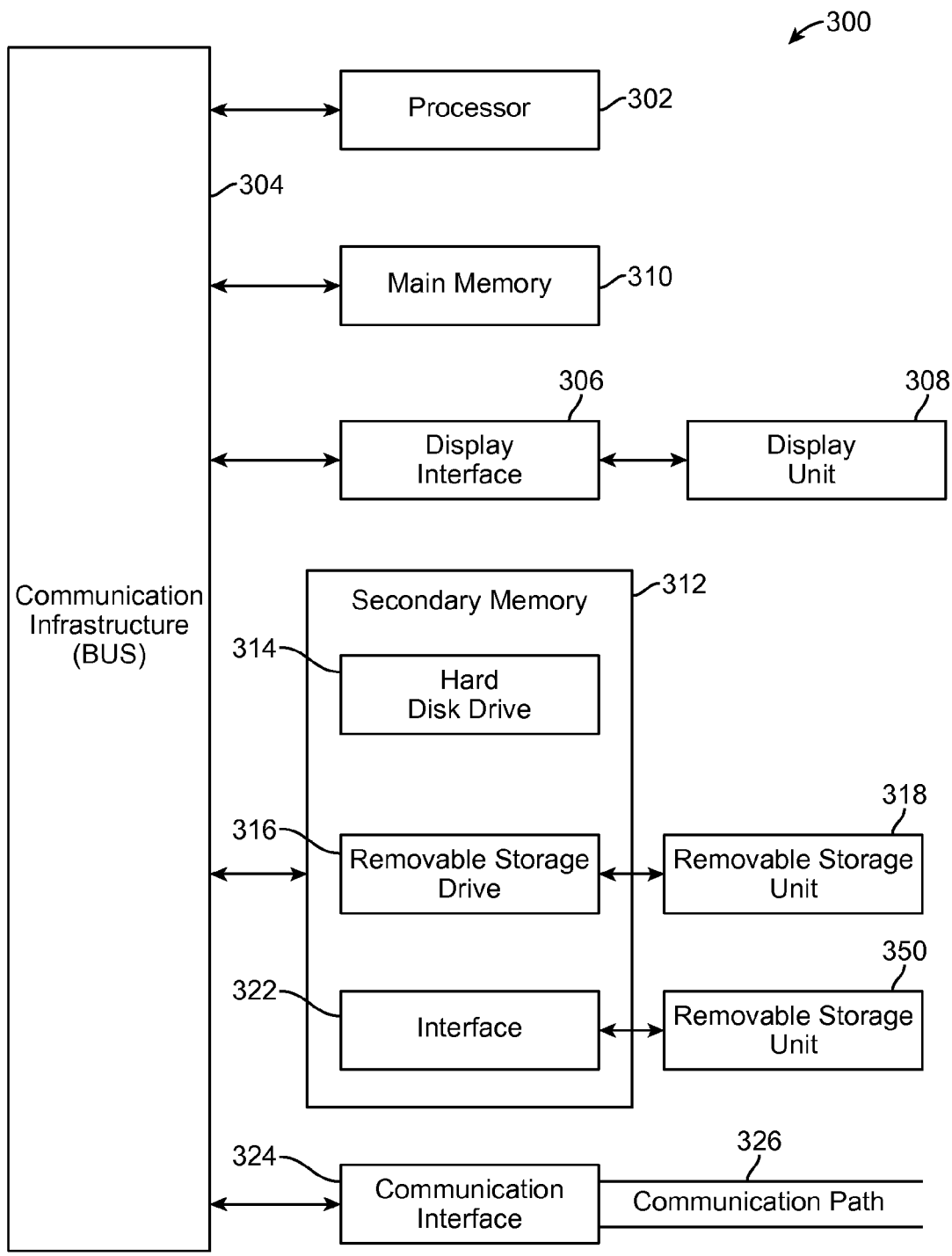
FIG. 14 is a high level block diagram showing an information processing system 300 useful for implementing one embodiment of the present invention.

FIG. 14 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 350 and an interface 322. Examples of such means may include a program package and package interface (such as that found in video game devices), a removable memory chip (such as an EPROM, or PROM) and associated socket, and other removable storage units 350 and interfaces 322 which allow software and data to be transferred from the removable storage unit 350 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for quantized congestion notification in a virtual networking system comprising multiple virtual networks, wherein each virtual network comprises a physical network interface card (NIC) and a server with a hypervisor running on the server to generate at least one virtual machine for generating one or more packet flows, the method comprising:

at a physical NIC of at least one virtual network:
  assigning a virtual machine of the virtual network with a corresponding virtual reaction point identifier (VRPID) identifying the virtual machine as a reaction point, wherein the corresponding VRPID of the virtual machine is associated with a flow identifier of a packet flow generated by the virtual machine, and wherein the corresponding VRPID of the virtual machine is further associated with a corresponding virtual tunnel end point (VTEP) for distributing the packet flow;
  tagging each outgoing packet of the packet flow with a congestion notification tag including the corresponding VRPID of the virtual machine, wherein each tagged outgoing packet of the packet flow is distributed via the corresponding VTEP; and
  in response to detecting a packet congestion at a virtual resource for the virtual machine based on a sampling of packets distributed across the virtual resource from the corresponding VTEP:
    assigning the virtual resource with a corresponding virtual congestion point identifier (VCPID) identifying the virtual resource as a congestion point, wherein the corresponding VCPID of the virtual resource is associated with the corresponding VTEP; and
    generating a congestion notification message for the congestion point, wherein the congestion notification message comprises the corresponding VCPID of the virtual resource and a VRPID of a different virtual machine contributing to the packet congestion at the congestion point, and wherein the corresponding VTEP forwards the congestion notification message to the different virtual machine contributing to the packet congestion at the congestion point.

2. The method of claim 1, further comprising:
at a physical NIC of at least one virtual network:
receiving incoming packets targeting a virtual machine of the virtual network from a VTEP that a corresponding VRPID of the virtual machine is associated with.

3. The method of claim 1, wherein the congestion notification message further includes a source media access control (MAC) address of the different virtual machine contributing to the packet congestion at the congestion point.

4. The method of claim 1, wherein the congestion notification message is forwarded to a virtual network interface card (vNIC) of the different virtual machine contributing to the packet congestion at the congestion point.

5. The method of claim 1, further comprising:
at a virtual machine of at least one virtual network:
in response to receiving a congestion notification message, adjusting, based on the congestion notification message received, at least one rate of packet generation corresponding to the virtual machine.

6. The method of claim 1, wherein:
the corresponding VRPID of the virtual machine is associated with the flow identifier of the packet flow by mapping the corresponding VRPID of the virtual machine to the flow identifier of the packet flow;
the corresponding VRPID of the virtual machine is associated with the corresponding VTEP by mapping the corresponding VRPID to the corresponding VTEP; and
the corresponding VCPID of the virtual resource is associated with the corresponding VTEP by mapping the corresponding VCPID to the corresponding VTEP.

7. The method of claim 1, wherein:
each virtual resource for each virtual machine comprises a set of queuing and buffering resources; and
each physical NIC includes overlay offload logic.

8. The method of claim 1, further comprising:
at a physical NIC of at least one virtual network:
encapsulating each outgoing packet of each packet flow generated by each virtual machine of the virtual network with encapsulation data based on tunneling parameters related to a VTEP that a corresponding VRPID of the virtual machine is associated with, wherein the encapsulation data includes a copy of a congestion notification tag that the outgoing packet is tagged with, such that the encapsulated outgoing packet comprises an outermost congestion notification tag and an innermost congestion notification tag.

9. The method of claim 8, wherein:
each packet is distributed via a plurality of switches including at least one overlay switch and at least one non-overlay switch;
each overlay switch processes an innermost congestion notification tag of a packet if an outermost congestion notification tag of the packet is different from said innermost congestion notification tag; and
each non-overlay switch processes an outermost congestion notification tag of a packet.

10. The method of claim 1, wherein the virtual networking system interoperates with physical components underlying the virtual networking system.

11. A system comprising a computer processor, a computer-readable hardware storage device, and program code embodied with the computer-readable hardware storage device for execution by the computer processor to implement a method for quantized congestion notification in a virtual networking system comprising multiple virtual networks, wherein each virtual network comprises a physical network interface card (NIC) and a server with a hypervisor running on the server to generate at least one virtual machine for generating one or more packet flows, the method comprising:
at a physical NIC of at least one virtual network:
assigning a virtual machine of the virtual network with a corresponding virtual reaction point identifier (VRPID) identifying the virtual machine as a reaction point, wherein the corresponding VRPID of the virtual machine is associated with a flow identifier of a packet flow generated by the virtual machine, and wherein the corresponding VRPID of the virtual machine is further associated with a corresponding virtual tunnel end point (VTEP) for distributing the packet flow;
tagging each outgoing packet of the packet flow with a congestion notification tag including the corresponding VRPID of the virtual machine, wherein each tagged outgoing packet of the packet flow is distributed via the corresponding VTEP; and
in response to detecting a packet congestion at a virtual resource for the virtual machine based on a sampling of packets distributed across the virtual resource from the corresponding VTEP:
assigning the virtual resource with a corresponding virtual congestion point identifier (VCPID) identifying the virtual resource as a congestion point, wherein the corresponding VCPID of the virtual resource is associated with the corresponding VTEP; and
generating a congestion notification message for the congestion point, wherein the congestion notification message comprises the corresponding VCPID of the virtual resource and a VRPID of a different virtual machine contributing to the packet congestion at the congestion point, and wherein the corresponding VTEP forwards the congestion notification message to the different virtual machine contributing to the packet congestion at the congestion point.

12. The system of claim 11, the method further comprising:
at a physical NIC of at least one virtual network:
receiving incoming packets targeting a virtual machine of the virtual network from a VTEP that a corresponding VRPID of the virtual machine is associated with.

13. The system of claim 11, wherein the congestion notification message further includes a source media access control (MAC) address of the different virtual machine contributing to the packet congestion at the congestion point.

14. The system of claim 11, wherein the congestion notification is forwarded to a virtual network interface card (vNIC) of the different virtual machine contributing to the packet congestion at the congestion point.

15. The system of claim 11, the method further comprising:
at a virtual machine of at least one virtual network:
in response to receiving a congestion notification message, adjusting at least one rate of packet generation corresponding to the virtual machine based on the congestion notification message received.

16. The system of claim 11, the method further comprising:
at a physical NIC of at least one virtual network:
encapsulating each outgoing packet of each packet flow generated by each virtual machine of the virtual network with encapsulation data based on tunneling parameters related to a VTEP that a corresponding VRPID of the virtual machine is associated with, wherein the encapsulation data includes a copy of a congestion notification tag that the outgoing packet is tagged with, such that the encapsulated outgoing packet comprises an outermost congestion notification tag and an innermost congestion notification tag.

17. The system of claim 16, wherein:
   each packet is distributed via a plurality of switches including at least one overlay switch and at least one non-overlay switch;
   each overlay switch processes an innermost congestion notification tag of a packet if an outermost congestion notification tag of the packet is different from said innermost congestion notification tag; and
   each non-overlay switch processes an outermost congestion notification tag of a packet.

18. The system of claim 11, wherein the virtual networking system interoperates with physical components underlying the virtual networking system.

19. A computer program product comprising a computer-readable hardware storage device having program code embodied therewith, the program code being executable by a computer to implement a method for quantized congestion notification in a virtual networking system comprising multiple virtual networks, wherein each virtual network comprises a physical network interface card (NIC) and a server with a hypervisor running on the server to generate at least one virtual machine for generating one or more packet flows the method comprising:
   at a physical NIC of at least one virtual network:
      assigning a virtual machine of the virtual network with a corresponding virtual reaction point identifier (VRPID) identifying the virtual machine as a reaction point, wherein the corresponding VRPID of the virtual machine is associated with a flow identifier of a packet flow generated by the virtual machine, and wherein the corresponding VRPID of the virtual machine is further associated with a corresponding virtual tunnel end point (VTEP) for distributing the packet flow;
      tagging each outgoing packet of the packet flow with a congestion notification tag including the corresponding VRPID of the virtual machine, wherein each tagged outgoing packet of the packet flow is distributed via the corresponding VTEP; and
      in response to detecting a packet congestion at a virtual resource for the virtual machine based on a sampling of packets distributed across the virtual resource from the corresponding VTEP:
         assigning the virtual resource with a corresponding virtual congestion point identifier (VCPID) identifying the virtual resource as a congestion point, wherein the corresponding VCPID of the virtual resource is associated with the corresponding VTEP; and
         generating a congestion notification message for the congestion point, wherein the congestion notification message comprises the corresponding VCPID of the virtual resource and a VRPID of a different virtual machine contributing to the packet congestion at the congestion point, and wherein the corresponding VTEP forwards the congestion notification message to the different virtual machine contributing to the packet congestion at the congestion point.

20. The computer program product of claim 19, the method further comprising:
   at a physical NIC of at least one virtual network:
      receiving incoming packets targeting a virtual machine of the virtual network from a VTEP that a corresponding VRPID of the virtual machine is associated with.

* * * * *